3,481,971
CUPROUS HALIDE SLURRY PROCESS FOR LIGAND PURIFICATION

Robert P. Cahn, Millburn, Robert B. Long, Atlantic Highlands, and Ralph Cecchetti, Hanover, N.J., and Jesse M. Carr, Jr. and Richard J. De Feo, Baton Rouge, La., assignors to Esso Research and Engineering Company, a corporation of Delaware
No Drawing. Filed Sept. 19, 1966, Ser. No. 580,190
The portion of the term of the patent subsequent to Nov. 12, 1985, has been disclaimed
Int. Cl. C07c *121/32, 11/16, 7/16*
U.S. Cl. 260—465.9
26 Claims

ABSTRACT OF THE DISCLOSURE

A process for the recovery of complexible ligands using active cuprous chloride sorbent particles of molar ratios of copper complexing ligand of 1:1 and 2:1, and higher, where in the sorbent particles are slurried in a hydrocarbon organic liquid diluent essentially inert to reaction with cuprous chloride to effect liquid phase slurry complexing. Sorption is followed by desorption, while the sorbent particles are slurried in said diluent, to recover said ligand.

CROSS REFERENCE TO RELATED APPLICATIONS

Also filed on same date as present application were three other applications on slurry processes employing porous cuprous halide particles: Fasce, Ser. No. 580,173 now Patent 3,140,924; De Feo et al., Ser. No. 580,436 now Patent 3,412,172; and Carr et al., Ser. No. 580,172.

The present invention is directed to a process for recovering complexable ligands having an enhanced purity from essentially anhydrous feeds containing them in lesser concentrations and lower purity by contacting said feeds with an essentially anhydrous slurry of solid, sorption-active cuprous halide sorbent particles selected from the group consisting of cuprous chloride, cuprous bromide, and cuprous iodide in an essentially anhydrous organic liquid diluent boiling higher than said ligands, and preferably also the other feed components, to complex said cuprous halide with said ligands, and desorbing said complex in the presence of said liquid diluent to recover said ligands.

More specifically, the present invention is directed to a process for recovering a complexable ligand of enhanced purity from an essentially anhydrous feed containing it in lower purity wherein said ligand is capable of forming a stable complex with said cuprous halide sorbents which comprises: (A) contacting said feed with an essentially anhydrous slurry of (1) solid, sorption-active cuprous halide sorbent particles selected from the group consisting of cuprous chloride, cuprous bromide, and cuprous iodide and having a porosity above about 10% (of the volume of a particle) 550 to 10,000 A. pores in (2) an essentially anhydrous organic liquid diluent having a boiling point above the boiling point of said complexable ligand at temperature and pressure conditions sufficient to effect liquid phase formation of a solid, insoluble cuprous halide-ligand complex, and (B) desorbing said solid complex in the presence of said liquid diluent to recover said ligand. Usually the desorption is conducted by heating the complex in the presence of the organic liquid diluent to thermally dissociate the complex ligand therefrom.

According to one of the preferred embodiments of this invention, the liquid phase slurry complexation is conducted in a plurality of slurry-contacting steps sequentially performed with each succeeding liquid phase complexing step being conducted at a lower temperature than the preceding one and with all of said steps being conducted in the presence of said organic liquid diluent. In temperature staged ligand recovery it is desired to conduct as much of the complexation as possible in the first (higher) temperature complexation stage as this enhances product purity of the ligand being recovered and reduces the concentration therein of undesired cocomplexable ligands which (even though present in the feed in very small amounts, e.g., <5 wt. percent and usually <1 wt. percent) are difficult to separate from the product ligand being recovered. These undesired cocomplexable ligands (e.g., vinyl acetylene in butadiene-1,3, recovery procedures) characteristically form >1:1 mol complexes and usually 2:1 or higher mol complexes with the cuprous halide sorbents having approximately the same order of stability as the ligand sought to be recovered. As will be noted in the below examples, complexation temperature affects product ligand purity, i.e., the higher liquid phase complexing temperature giving the more pure product. For example, when a large portion (>60%) of the total complexation is done at the higher temperatures, a higher purity product ligand is obtained than if all the complexing is carried out at the lower "clean-up" stage temperatures, and this surprising product ligand purity improvement is attainable regardless of the specific ligand being recovered, e.g., butadiene-1,3, ethylene, propylene, acrylonitrile, isoprene, etc., by conducting the major portion of complexing at the higher temperatures.

Certain prior art ligand separation processes for selectively removing complexable ligands from feed streams containing them are based on vapor phase selective complexing of the ligands to be removed followed by vapor phase decomplexing thereof to recoup the desired ligand. Although some of these processes employ cuprous halide sorbents having high activity for sorption, these prior art procedures often require at least several complexation stages to be performed with each complexing stage being conducted in a separate fixed or fluidized complexing bed in the vapor phase due to the highly exothermic nature of the complexation reaction, and the comparatively slow vapor phase reaction involved. In turn, each complexing bed must be internally cooled using a large number of cooling tubes internally disposed within each complexing bed to remove the heat of reaction. These tubes, of course, periodically require maintenance, cleaning, etc., to prevent complex bed reactor fouling. Moreover, such prior art procedures require a large inventory of cuprous halide sorbent compared to the process of this invention, since each vapor phase complexing bed must contain sufficient sorbent in insure the attainment of quantitative recovery goals.

Moreover, it has been noted in conjunction with vapor phase sorption procedures that the cuprous halide sorbents are subjected to fairly rapid loss of sorptive capacity and activity. Consequently, the once sorption-active cuprous halide sorbents must be reactivated on a fairly continual basis, which increases the cost of conducting vapor phase fixed or fluidized bed ligand recovery procedures. Thus, the conventional prior art vapor phase processes are very expensive, due to the abovementioned necessities of regenerating the capacity of the sorbent, maintaining conventional internal refrigeration, and maintaining a large invetory of cuprous halide sorbet particles throughout the processing. These increased maintenance, apparatus, refrigeration and inventory costs detract significantly from the economic incentive of high purity ligand recovered.

Certain other prior art ligand separation processes for recovering ligands from feed streams containing them in comparatively dilute amounts are based on liquid phase injection of the feed into a fluidized bed or transfer line of cuprous halide sorbent particles followed by vapor phase decomplexing and drying of the sorbent particles. These processes ordinarily suffer from packing (agglomeration) of the sorbent particles to such an extent that cement mixer type apparatus, scrapers, etc., are frequently required to retain the fairly close particle size control required for effective operations both in the complexing and decomplexing stages thereof. If such precautions are not observed, the agglomeration occurring in such procedures in turn results in much reduced activity of the sorbent particles. Also, of course, the advisable complete separation of the uncomplexed material from the complexed cuprous halide sorbents (so as to obtain a more pure product ligand) is extremely difficult when the sorbent agglomerates. In such procedures, while the complexing is done in the liquid phase, the decomplexing (and any additional operation such as intermediate stripping) are usually accomplished in the gaseous phase, and the cuprous halide sorbent particles must be deliquefied and thoroughly dried (to insure adequate regeneration of the sorbent activity) prior to reuse to accomplish further ligand recovery.

Slurry ligand recovery procedures have been tried in the prior art but these procedures largely involve aqueous slurries or slurries using raw cuprous halide salts to recover monoolefinic ligands. These prior art procedures suffer from several drawbacks which detract from widespread acceptance thereof. The chief drawbacks of aqueous slurry-based recovery procedures reside in the corrosion caused by the water on complexing, stripping and decomplexing vessels, disproportionation of the cuprous ion to copper and cupric ion, agglomeration of the sorbent and the degradation of the sorbents by side reactions such as hydration, hydroxyl formation and oxidation, in addition to more expensive refrigeration costs. The procedures utilizing raw (comparatively sorption-inactive) salts to recover monoolefinic ligands, e.g. ethylene, propylene, and butylenes, suffer from very low recoveries and only slight improvement in purity of the recovered ligands (versus their purity in the feedstreams). Consequently, raw salt requirements are unusually high and inventory and equipment costs (due to the large volume of salt required plus recycle and pumping facilities) for all practical purposes in the past have ruled out such procedures for use in commercial recovery applications.

The present invention, on the other hand, overcomes most, if not all, of the drawbacks present in the abovementioned prior art recovery procedures. Thus, the present invention achieves high recoveries of product ligand in very good purity, exhibits little or no corrosion problems, evidences little or no debilitating agglomeration, does not require close control of sorbent particle size, significantly reduces refrigeration requirements, sorbent inventory requirements, regeneration requirements, system maintenance and does not require either deliquefication or drying of the sorbent particles at any stage of processing. Moreover, if the ligand removed from the feed stream is one forming a complex with cuprous chloride, bromide, or iodide having a mole ratio of copper to complexing ligand, e.g., at least 2:1, the sorption-active cuprous halide sorbent particles do not require any form of regeneration whatsoever to enhance their sorptive activity and capacity even after markedly extended periods of use and reuse. Even in the case of recovering ligands having the mole ratios of copper to complexed ligand of 1:1 or less, it is not usually necessary to regenerate the sorptive capacity of the previously highly sorption-active cuprous halide sorbent particles unless and until the sorptive capacity thereof falls below a desired plateau. In any event, the sorption-active particles are kept in contact with the organic liquid diluent material throughout the entire procedure which involves in essence complexing (sorption) and decomplexing (desorption) with or without intermediate stripping operations, if desired. Hence, the present invention effectively overcomes the abovementioned drawbacks encountered in prior art procedures, and constitutes a highly advantageous and economical solution to these and other problems encountered in recovering complexable ligands from feed streams by the use of sorbent particles. Moreover, the use of nearly ambient temperatures throughout or at least in the initial stage(s) of slurry complexing assists in minimizing the cooling costs compared to previously known procedures for ligand recovery based on selective complexation with sorbent particles. The process of this invention exhibits great flexibility with respect to sorbent particle size since recovery and ligand purity are not tied to maintenance of a certain particle size limitation and distribution therein. Usually, however, cuprous halide sorption-active sorbent particles are employed which are less than 200 microns in size in order to facilitate maintaining the slurry and pumping the slurry throughout the ligand recovery system.

These and other advantages of the present invention will be apparent from the description which follows.

Another object of the invention is to provide a composition of matter useful in recording complexable ligands in increased concentration and of enhanced purity from feeds containing them in considerably lesser concentrations and purity. Such compositions are comprised of sorption-active, porous cuprous halide solids selected from the group consisting of cuprous chloride, cuprous bromide and cuprous iodide and having a porosity above about 10% (of the volume of a particle) 550 to 10,000 A. pores in an essentially anhydrous inert hydrocarbon liquid diluent. The preferred cuprous halide is cuprous chloride because of its far greater sorptive capacity, activity maintenance, and because it can be prepared readily from the more readily available and lower cost cuprous chloride. While the anhydrous hydrocarbon diluent can be selected from a wide group of materials, usually the diluent is a $C_5$ to $C_{12}$ paraffin (preferably one having 5 to 7 carbon atoms), a $C_6$ to $C_{12}$ monocyclic aromatic containing up to six alkyl substituent carbon atoms, or mixtures containing any two or more of the above. The hydrocarbon diluent has a boiling point ranging from 0 to 500° F., and these compositions can contain from about 10 to 70 wt. percent of said sorption active cuprous chloride solids, based on the total of solids and liquid. The average particle size of said cuprous chloride solids ranges from about 0.1 to 200 microns.

The process of this invention can be conducted readily by passing the feed stream, either in gaseous or liquid from (but preferably in liquid form), in contact with a previously prepared slurry of said sorption-active cuprous halide sorbent particles having an average particle size of less than 200 microns, and a porosity above about 10% (of the volume of a particle) 550 to 10,000 A. pores in an essentially anhydrous organic liquid diluent which has a boiling point higher than the boiling point of the complexable ligand. The complexation is conducted at liquid phase temperature and pressure conditions, in order to form a solid cuprous halide-ligand complex which is insoluble in the slurry liquid diluent medium. If the feed which contains the complexable ligand also contains close boiling materials which are soluble in the slurry liquid diluent medium and which may or may not also complex with the sorbent particles, but less preferentially than the ligand sought to be removed, then it is usually desirable to strip the less preferentially dissolved and/or sorbed material(s) from the complexed slurry of sorbent particles prior to desorption thereof (to remove the ligand which is preferentially complexed). The desorption then yields the product ligand in higher purity and concentration. Of course, in cases where one or more of the undesired feed components is insoluble in the inert diluent used, and no complexing of such feed components occurs at process conditions, considerably less or even no stripping still yields high purity product ligand.

According to the present ligand recovery process, a substantial portion, e.g., usually at least 25 wt. percent of the total amount of cuprous halide solid sorbent particles is sorption-active. The term "sorption-active" as used herein is employed to denote cuprous halide sorbent particles which have a porosity of above about 10% (of the total volume of a particle) 550 to 10,000 A. pores, as determined by mercury porosimeter measurements. Preferably, at any given stage in the above-indicated ligand separation and recovery process, the concentration of sorption-active cuprous halide particles (at lined out conditions) ranges from about 50 to 99+% by weight based on the total amount of solid cuprous halide particles in the slurry. The sorptive capacity of these sorption-active sorbent particles usually ranges from about 35 to 99+% and more preferably from 50 to 99+%, based on the theoretical capacity for sorption of the ligand being recovered. For example, if the ligand being recovered is 1,3-butadiene; the theoretical sorptive capacity will depend upon the stoichiometric ratio in which the 1,3-butadiene complexes with the cuprous halide. Thus, one mole of 1,3-butadiene complexes with 2 moles of cuprous chloride. The overall sorptive capacity of the total amount of solid cuprous halide sorbent particles present in the slurry can range from 20 to 95%, which is an average figure giving the overall or average sorptive capacity of the total amount of cuprous halide sorbent present in the slurry including material which is of high sorptive capacity and material having lesser sorptive capacity, e.g., material whose sorptive capacity has been diminished.

The sorption-active said cuprous halide sorbent particles can be prepared starting with fairly dry high purity, viz., 95+% pure commercial cuprous chloride, cuprous bromide, and cuprous iodide salt containing less than about 0.8% moisture. The preferred cuprous halide sorbents are cuprous chloride sorbents prepared from 99+% pure cuprous chloride salt which is substantially moisture-free, viz, contains less than 0.5 wt. percent moisture (based on dry cuprous chloride).

The sorption-active porous sorbent particles can be prepared from raw cuprous halide salts by a straight forward two-stage procedure of complexing and decomplexing using a conditioning ligand capable of forming a >1:1 mole ratio stable complex with said cuprous halide, viz, wherein the complex has a mole ratio of copper to complexing ligand of greater than 1:1. The complexing operation imparts to the raw salt the requisite porosity upon decomplexing thereof. The desorption is usually conducted thermally by heating the previously complexed raw salt to thermally dissociate the complex therefrom, thus leaving the sorption-active cuprous halide sorbent particles. However, the sorption-active cuprous halide sorbent particles can be prepared in accordance with a wide variety of sorbent preparation procedures, e.g., as set forth in U.S. Ser. Nos. 333,925 and 333,926 filed on Dec. 27, 1963 both now abandoned. The disclosure of these cuprous halide sorbent preparation procedures is incorporated herein by reference. Basically, the procedures of Ser. Nos. 333,925 and 333,926 involve either dissolving the cuprous halide salts in a suitable solvent, or forming an aqueous or other slurry thereof followed by complexing the dissolved or slurry particles with a conditioning (complexing) ligand capable of forming a stable copper-ligand complex having a mole ratio of copper to complexing ligand of greater than 1:1.

If the copper-conditioning ligand complex is formed from a solution of the cuprous halide salt, the cuprous halide solution is usually prepared by dissolving the raw cuprous halide salt in $C_4$ to $C_{12}$ monoolefin solvent at temperatures ranging from about —40° F. to about 140° F. accompanied by stirring or other agitation to insure adequate dissolving of the salt in the solvent. The thus formed solutions are then filtered to remove insolubles prior to complexing and decomplexing as mentioned above. Whether the sorption-active cuprous halide sorbent particles are prepared by the solution or slurry procedures of Ser. Nos. 333,925 or 333,926 or any other suitable method, it is preferable to employ conditioning ligands which form a stable complex having a mole ratio of copper to conditioning ligand of 2:1 or even higher. Such compounds include both materials which form only complexes having said ratios of copper to complexing compounds greater than 1:1 and also compounds which form complexes having a ratio of 1:1 or less, which upon decomplexing pass through a stable complex having a ratio of copper to complexing compound greater than 1:1, and preferably of 2:1 and even higher as indicated above. Thus, certain materials, e.g., nitriles, diolefins, acetylenes, carbon monoxide, etc., under ordinary conditions forming a 2:1 complex can be made to complex in ratios of copper to complexing compound of 1:1 or less. However, upon dissociation, complexing material is released selectively from a bed of cuprous halide until the stable complex, viz, the complex having a copper to complexing ligand mole ratio above 1:1, e.g., 2:1 stoichiometric complex is completely formed before further decomplexing to the uncomplexed (sorption-active) cuprous halide sorbent particles occurs. In this specification by "stable complex" is meant a stoichiometric complex stable upon dissociation as described in the preceding sentence. Such "conditioning ligands" which can be employed to prepare sorption-active cuprous halide sorbent particles which are used in accord with this invention include, but are not limited to, the following conditioning ligands: $C_3$ to $C_{10}$ conjugated and nonconjugated aliphatic, cyclic, and alicyclic polyolefins, e.g., butadiene-1,3, isoprene, piperylene, allene, octadiene, cyclohexadiene, cyclooctadiene, divinylbenzene, cyclododecatriene, $C_2$ to $C_{10}$ aliphatic and alicyclic acetylenes, or acetylenes containing additional unsaturation, e.g., acetylene, methylacetylene, propylacetylene, phenylacetylene, vinylacetylene, etc.; $C_2$ to $C_{10}$ and higher unsaturated or saturated aliphatic or alicyclic nitriles, e.g., acetonitrile, acrylonitrile, propionitrile, phenylnitrile, methacrylonitrile, ethacrylonitrile, etc.; carbon monoxide; HCN, etc. Of course, more than one of these functional groups can be present in a single molecule of the "conditioning ligand."

Usually the particle size of the sorption-active cuprous sorbent particles will be directly proportional to the particle size of the cuprous halide salt from which the active sorbent particles are prepared. As mentioned above, one of the benefits of the present invention is that there is no great necessity to maintain careful control over the particle size of the sorption-active sorbent particles during the slurry recovery procedure of the present invention. Usually, however, the slurry particles will have average particle sizes of less than about 200 microns with characteristically individual particles ranging in size from about 0.05 to about 400 microns. Preferably the average particle size of the sorbent particles is less than about 100 microns with characteristically average individual particles ranging in size from about 0.1 to about 250 microns. In order to prepare a slurry containing the sorption-active particles within the abovementioned size ranges, it is merely necessary to prepare them from the approximately equivalent size comparable raw cuprous halide salts using any suitable activation procedure such as those mentioned hereinabove in conjunction with Ser. Nos. 333,925 and 333,926.

The inert organic liquid diluent employed in the ligand recovery process of this invention can be any anhydrous organic liquid diluent which (1) has a boiling point above the boiling point of the complexable ligand recovered from the feed stream and (2) does not form a stable complex with the complexing agent at process conditions. Also, however, it is preferable to employ a ligand having a boiling point higher than any component in the feed stream. The specific organic liquid diluent selected in a given case will, of course, depend upon the ligand being recovered and the components of the particular feed stream from which it is recovered. Bearing this in mind, usually the organic liquid diluent boils above 10° F., melts below 70° F., has a low viscosity at operating temperatures, dissolves less than about 5%, preferably less than 1%, of either said sorption-active cuprous halide sorbent particles or the ligand complexes thereof, and can be separated readily from the product ligand in the final recovery procedure (as well as from any other feed components), preferably by simple distillation or flashing procedures.

While it is not a requirement of the organic liquid diluent that it be chemically inert to complexation with the cuprous halide sorbent particles, it is preferred that the organic liquid diluent be one essentially inert to complexation with the selected cuprous halide sorbent. In cases where the organic liquid diluent is complexable with the cuprous halide sorbent particles, it should always be one which is less preferentially complexable therewith than the ligand to be recovered from the feed stream. For example, where the ligand to be recovered is ammonia, a slurry of sorption-active cuprous chloride solids in acetonitrile can be used because ammonia is more preferentially sorbed.

Suitable organic liquid diluents which can be employed in accordance with this invention include, but are not limited to, the following materials, isomers, blends, and mixtures thereof: paraffin hydrocarbons having at least 1 carbon atom more than the ligand being recovered from the feed, e.g., $C_3$ to $C_{12}$ paraffins and cyloparaffins, esp., propane, n-butane, isobutane, n-pentane, isopentane, methyl cyclopentane, n-hexane, isohexane, cyclohexane, n-heptane, methyl cyclohexane, isoheptane, n-octane, isooctane, n-nonane, n-decane, n-undecane, n-dodecane or higher, as well as mixtures and isomers thereof, e.g., narrow boiling naphthas corresponding in carbon number content to $C_3$ to $C_{12}$ paraffins individually (or in admixture); $C_6$ to $C_{12}$ monocyclic aromatics, including alkylated monocyclic aromatic hydrocarbons containing from 1 to 6 alkyl substituent carbon atoms, e.g., benzene, toluene, xylenes, mesitylene, ethylbenzene, ethyltoluenes, cymene, cumene, etc.; other aromatics including those containing in excess of 12 carbon atoms such as bicyclic, tricyclic, and tetracyclic compounds, including, but not limited to, methyl naphthalenes and polymethyl anthracenes and phenanthrenes; and, of course, any less preferentially sorbed organic material having the physical properties specified herein, e.g. acetonitrile, allyl chloride, allyl bromide, etc. Usually, it is desirable to employ an organic liquid diluent which is comprised in toto or a major portion of at least one component having a sufficiently low boiling point, so that the boiling point of the organic liquid diluent at process conditions is lower than the temperature at which said cuprous halide sorbent particles are thermally deactivated due to annealing or other adverse thermal effects. Of course, if a diluent blend of two or more components is employed, one component can have a boiling point lower than the thermal deactivation temperature of the sorbent particles whereas another component(s) has a boiling point higher than said sorbent deactivation temperature as long as the composite boiling point of the diluent at process conditions is below the sorbent deactivation temperature.

The use of inert liquid hydrocarbon diluents, especially $C_5$ to $C_{12}$ paraffins and $C_6$ to $C_{12}$ monocyclic aromatic hydrocarbons are preferred in accordance with this invention. While the preferred organic liquid diluents in accordance with this invention are hydrocarbon diluents, this does not mean that organic diluents having a small amount or even significant halogenated substitution cannot be employed satisfactorily in accordance with this invention. Thus, the present invention includes within its broad purview the use of halogenated hydrocarbons as inert organic liquid diluents, as long as the halogenated hydrocarbons are essentially inert to reaction with the cuprous halide sorbent and the ligand being recovered from the feed stream and also the major additional component(s) present in the feed stream. Suitable halogenated organic diluents coming within this category include, but are not limited to, the following: carbon tetrachloride, ethyl chloride, ethyl bromide, ethylene dichloride, ethylene dibromide, propyl chloride, propyl bromide, butyl fluoride, butyl chloride, butyl bromide, amyl fluoride, amyl chloride, amyl bromide, etc., as well as mixed halides such as difluoro-dichloro methane, ethane, etc.

The slurry contacted with the feed stream contains from 10 to about 70 wt. percent of the sorption-active cuprous halides solids, based on the total of slurry solids and liquids. The sorbent and organic liquid diluent should both be essentially anhydrous and definitely free from any bulk water. The feed stream should also be essentially water-free and should not contain more than about 300 parts per million water and preferably less than 100 parts per million water. The concentration of said organic liquid diluent in the slurry based on the total cuprous halide solids therein ranges from 40 to 900 wt. percent. In this regard it should be noted that probably not all of the cuprous halide solids are equally active at all stages in the recovery process. It should also be remembered that the concentration of the sorption-active cuprous halides solids in the slurry medium after contact with the feed stream will be less than that present in the slurry composition prepared prior thereto because of the increase in weight of the total working slurry, viz, sorption-active slurry plus feed stream, due to the weight of the feed stream. It should also be noted that the feed stream can be contacted with the slurried sorbent solids with feed stream in gaseous form, i.e., by bubbling the feed stream into the slurry of sorption-active cuprous halide particles and organic liquid diluent. As long as the slurry complexing is conducted in the liquid phase, the feed stream can be passed into contact with the slurry in either gaseous or liquid form.

The liquid phase slurry complexing can be carried out in one or a series of steps at any temperature and pressure conditions which yield liquid phase complexation. Of course, the specific complexing temperatures and pressures employed during the slurry liquid phase complexation will depend mainly upon the specific ligand being recovered and the specific feed stream in which the ligand is present. Another factor governing the temperature of the liquid phase complexation is that even when a ligand being recovered has a very high boiling point, as well as the feed stream in which it is present, and despite the fact that the inert organic liquid diluent has an equal or higher boiling point, the complexing and decomplexing operations should not be conducted at temperatures exceeding the thermal deactivation temperature of the sorbent particles. With these parameters in mind, complexing is usually conducted at temperatures ranging from −80 to 180° F. and comparable pressures of 0 to 500 p.s.i.g. According to a preferred embodiment of this invention, and especially when it is desired to recover multiolefins such as conjugated diolefins, e.g., butadiene; the complexing is conducted in a series of slurry contacting steps wherein each succeeding liquid phase slurry complexing step is conducted at a lower temperature than the one preceding it, with all said steps being conducted in the presence of the organic liquid diluent. For example, when recovering butadiene from a $C_4$ hydrocarbon stream containing about 30 to 40 wt. percent butadiene, 58 to 68 wt. percent butenes, 2 wt. percent butanes, very satisfactory recovery of butadiene-1,3 is secured using 3 complexing stages wherein the first complexing stage is conducted at temperatures of 0 to 150° F. using comparable pressures of 5 to 100 p.s.i.a., the second slurry complexing stage is conducted at temperatures of 0 to 110° F. and pressures of 5 to 70 p.s.i.a. and the third or clear-up complexing stage is conducted at temperatures of −20 to 70° F. and pressure of 1 to 30 p.s.i.a.

While it is not necessary to conduct stripping operations when the feed stream initially contains high concentrations of the ligands to be recovered; it is usually desirable to employ stripping when the feed stream contains a ligand in low concentrations and especially where the feed stream contains an additional component(s) having a boiling point(s) close to that of the primary ligand to be recovered.

The stripping can be accomplished by heating the complexed slurry at temperatures which are at or below, and preferably from 150 to 5° F. below, the decomplexing (desorption) temperatures to be employed in subsequent decomplexing step. Any organic liquid diluent lost during stripping can be recovered by splitting the diluent from the stripping gas at appropriate conditions of temperature and pressure. According to one embodiment of the present invention, the stripping can be performed using a material which in itself is complexable with cuprous halide sorbent particles. In face, the stripping can be conducted by washing the stripping column countercurrently with any suitable liquid or gaseous stripping material which can include a ligand complexable with the cuprous halide sorbent particles as long as the stripping is conducted at temperatures and pressures which do not cause significant decomplexation of the previously complexed desirable ligand to be recovered from the feed stream. Thus, for example, when the desirable ligand to be recovered present in the feed stream is butadiene-1,3, the stripping operation to remove any butenes present also in the feed stream can be conducted using relatively pure butadiene-1,3. The stripping can also be conducted by counter-current liquid washing or gaseous stripping using inert liquid hydrocarbon, esp., inert $C_5$ to $C_{12}$ paraffins. Also, any combinations of the above can be employed, such as counter-current stripping with mixtures of butadiene and $C_5$ to $C_{12}$ paraffin, in liquid or gas phase.

It may also be advisable to carry out a partial decomplexing operation to remove preferentially, undesirable ligands complexed from the feed stream. This decomplexing operation is carried out under such conditions that very little, if any, of the desirable complex is decomposed while the bulk of the undesired constituent's complex is broken down, allowing removal of the undesired constituent by stripping in any of the above mentioned manners. This partial decomplexing is achieved by heating to less severe conditions than the total decomplexing described below.

The complexed (and optionally stripped) cuprous halide slurry solids are then subjected to decomplexation (desorption) to desorb and recovery the previously sorbed ligand therefrom. Decomplexing can be accomplished at any suitable temperatures and pressures as long as they do not thermally deactivate the cuprous halide sorbent particles. Of course, the decomplexing must also be conducted at temperatures and pressure conditions wherein the organic liquid diluent remains in the liquid state. In this regard it should be clearly understood that the organic liquid diluent remains in the liquid state throughout the entire process, viz., during complexing, stripping, decomplexing, and splitting operations.

Preferably the decomplexing is conducted as rapidly as reasonably possible to minimize the residence time of the cuprous halide sorbent solids at high temperatures. The desorbed sorbent is now in a condition of sorption-activity again and can be recycled for further use as a working slurry to recover more complexable ligand from feed stream containing it. As noted from the discussion heretofore, when the ligand being recovered from the feed stream is one forming a stable complex with the cuprous chloride sorbent having a mole ratio of copper to complexing ligand of greater than 1:1; usually the cuprous halide sorbent particles will need no regeneration prior to recycling for further use; and when regeneration is employed, it is at very infrequent intervals. In this regard, satisfactory performance has been observed in butadiene recovery operations using sorption-active cuprous chloride slurry in $C_5$ to $C_7$ paraffins, which slurries have worked continuously for in excess of 800 hours on $C_4$ hydrocarbon streams containing approximately 30 wt. percent butadiene, 68 wt. percent butenes, and 2 wt. percent butanes.

On the other hand, when the ligand to be recovered complexes with the sorption-active cuprous halide sorbents in a mole ratio of 1:1 or less, it is sometimes desirable to regenerate the activity of the sorbent solids more often than when recovering the greater than 1:1 mole ratio ligands. The reason for this is that over-extended periods of use of the 1:1 and lower mole ratio forming feed ligands, per se, deactivate the previously sorption-active cuprous halide sorbent particles, whereas the greater than 1:1, e. g., 2:1 mole complex forming ligands do not deactivate the previously sorption-active sorbent particles and in fact even display an in situ regeneration of activity. Usually, it will be desirable to regenerate the previously active cuprous halides sorbents when recovering such ligands if the sorptive-activity and capacity of the ligand falls below about 50% of its initial activity or if the purity of the product ligand recovered falls below the desired level. Regeneration of the sorbent particles can be conducted by contacting them (complexing) with a suitable conditioning ligand such as any of those mentioned hereinabove, followed by decomplexation thereof to release the sorption-active material.

The ligands capable of being recovered from feed streams in accordance with this invention in higher purity and greater concentration than previously present in the feed include a wide variety of materials. Suitable recoverable ligands capable of forming a solid stable complex with said cuprous halide sorbents having a mole ratio of copper to complexing ligand of greater than 1:1 include, but are not limited to, the following: any and all of the previously mentioned ligands suitable as "conditioning ligands" for preparing the sorption-active cuprous halide sorbent particles from their corresponding raw salts; halogenated conjugated or non-conjugated aliphatic, cyclic, and alicyclic polyolefins, e.g., 2-chloro-1,3-butadiene, chloro and bromo piperylenes, chlorocyclohexadiene; unsaturated ethers such as divinyl ether; acetylenic halides, alcohols, acids, and esters such as propargyl chloride, propargyl bromide, propargyl alcohol, propargyl acetate, propargyl acid, etc.; various nitrile substituted acids, ethers, esters such as 2-hydroxy propionitrile, substituted butyronitriles, etc. Suitable ligands capable of being recovered in accordance with this invention and which form stable complexes with the sorptive-active cuprous halide sorbent particles having a mole ratio of copper to complexing ligand of 1:1 and below include, but are not limited to, the following: $C_2$ to $C_{20}$ monoolefins; especially ethylene, propylene and butylenes; vinyl aromatics such as styrene, vinyl toluene, etc.; cyclic olefins such as cyclopentenes, vinyl cyclohexane, cyclohexanes, cyclooctene, and cyclododecene; unsaturated aldehydes, alcohols, esters, and acids such as acrolein, acrylic acid, and its esters, allyl alcohol, carbon monoxide, ammonia, amines, halogenated olefins such as vinyl chloride, allyl halides, chlorobutenes, etc.

The present invention will be disclosed in greater detail by the examples which follow. These examples are included herein to illustrate rather than limit the present invention.

Example 1.—Butadiene recovery by contact with metaxylene slurry of active cuprous chloride Sorptive-active cuprous chloride solids were prepared in the following manner. Commercial 95% pure cuprous chloride was dissolved in concentrated hydrochloric acid until the solution was saturated. One volume of the saturated solution was then slowly added to four volumes of water through which 1,3-butadiene was being continuously bubbled to keep the water saturated with butadiene. The yellow butadiene-cuprous chloride complex precipitated, was filtered off, washed with isopropanol and anhydrous ether, and then dried in flowing nitrogen and stored as the complex. When the active cuprous chloride solids were needed, the complex was heated to 100° C. for about 15 minutes in a fluid bed using $N_2$ as the fluidizing gas.

The thus prepared active cuprous chloride sorbent particles were then added to metaxylene and stirred to prepare a slurry containing 50 wt. percent active cuprous chloride solids based on the total of solids plus liquid. There was no difficulty in suspending the cuprous chloride solids in the metaxylene slurry. While it settles out on standing, it is quite easy to redisperse simply by applying agitation to the slurry, e.g., by use of mechanical stirrers. A butadiene containing feed stream was bubbled into the abovementioned slurry which was previously cooled to ice temperature (32° F.). The slurry was allowed to stand for 16 hours at ambient temperatures. During this time the butadiene from the butadiene feed formed an insoluble complex with the sorptive-active cuprous chloride sorbent particles. (The particles in the slurry had particle size range of about 5 to 100 microns.) The complexed slurry was then heated at a temperature of approximately 212° F. after pouring off a portion of the metaxylene organic liquid inert diluent. However, the desorption, like the sorption, was also conducted in the presence of liquid metaxylene. The recovered butadiene was weighed and analyzed, and the weight percent of butadiene recovered was approximately 19% of the weight of cuprous chloride used, or about 90% of the theoretical amount which could be absorbed by the sorbent.

Example 2

The procedure of Example 1 is repeated, with the exception that the organic liquid inert diluent employed is n-decane and sorption-active cuprous chloride solid slurries were prepared having 40, 50, and 60 weight percent of sorption-active cuprous chloride solids, respectively. The cuprous chloride sorbent solids in each of the 40, 50, and 60% slurries have an average particle size of 50 microns, and range in size from about 5 to about 100 microns. The liquid phase slurry complexing is conducted at temperatures of −20 to 100° F. and accompanying pressures of 0 to 100 p.s.i.g., followed by desorption (decomplexing) at temperatures of 150 to 250° F. and accompanying pressures of 0 to 100 p.s.i.g. The butadiene recovered possesses a higher purity than that present in the butadiene containing feed stream, and more than 50% of the butadiene present therein is recovered.

Example 3.—Butadiene recovered from a $C_4$ stream also containing butenes and butanes by contact with an n-pentane slurry of active cuprous chloride solids A $C_4$ hydrocarbon stream, containing about 35 wt. percent 1,3-butadiene is collected in a cylinder as a liquid and the bulk water removed by decantation. The water of saturation was removed by passing the $C_4$ hydrocarbon stream liquid phase through a bed of activated alumina pellets. This dry $C_4$ hydrocarbon feed material is then contacted with a cuprous chloride active sorbent solids slurry in n-pentane. The dry $C_4$ hydrocarbon feed stream is employed to evaluate the capacity of the active cuprous chloride particles to recover 1,3-butadiene from a $C_4$ stream containing close boiling butenes. A typical feed analysis is shown in Table I.

TABLE I

| Compound: | Wt. percent |
|---|---|
| Isobutane and propylene | 0.51 |
| n-Butane | 1.37 |
| Butene-1 and isobutylene | 43.44 |
| t-Butene-2 | 11.03 |
| c-butene-2 | 8.09 |
| 1,3-butadiene | 35.13 |
| Methylacetylene | 0.03 |
| 1,2-butadiene | 0.17 |
| 1,4-butadiene | 0.02 |
| Ethylacetylene | 0.08 |
| Isoprene | 0.01 |
| Vinylacetylene | 0.12 |

The reaction vessel, a 1-liter jacketed glass autoclave, is cooled to 60° F. by circulating a coolant through the jacket and 300 grams of research grade n-pentane is added to the vessel. To this pentane is added 150 grams of sorption-active cuprous chloride sorbent solids having an average particle size of 50 microns and ranging in size from about 5 to 100 microns. The slurry is agitated using a 3 inch diameter marine propeller at a stirrer speed of 1200 r.p.m. With the slurry at 60° F., 100 grams of the above feed is added and complexation of the solid allowed to take place for a period of 1 to 60 minutes at 20 p.s.i.g. The slurry vessel then is removed from the agitator and subjected to stripping conditions of 60 to 100° F. and at pressures of 0 to 20 p.s.i.g. for 1 to 60 minutes to strip butenes therefrom. The thus stripped slurry was then subjected to temperatures of 170 to 200° F. at atmospheric pressures for 1 to 20 minutes to thermally decomplex the complexed (sorbed) butadiene which was collected in a condenser, weighed, and is then analyzed. The analysis is conducted by sensitive gas chromatographic equipment. A typical analysis of the product butadiene emanating after desorption of the cuprous chloride sorbent solids is shown in Table II:

TABLE II

| Compound: | Wt. percent |
|---|---|
| Isobutylane and propylene | 0.0005 |
| n-Butane | 0.0013 |
| Butene-1 and isobutylene | 0.0479 |
| t-Butene-2 | 0.0059 |
| c-Butene-2 | 0.0091 |
| 1,3-butadiene | 99.8633 |
| Methylacetylene | 0.0 |
| 1,2-butadiene | 0.0 |
| 1,4-pentadiene | 0.0409 |
| Ethylacetylene | 0.0019 |
| Isoprene | 0.0140 |
| Vinylacetylene | 0.0128 |

Additional complexation tests conducted as indicated above, except at other liquid phase reaction temperatures, yield decreased amounts of vinylacetylene in the 1,3-butadiene product with increasing temperature, and an overall increase in 1,3-butadiene concentrations. A gain of product purity is to be obtained by complexing at higher temperatures, and this advantage is shown in Table III.

TABLE III

| | Temperature of Complexing, ° F. | | | | | |
| --- | --- | --- | --- | --- | --- | --- |
| | 0 | 40 | 60 | 77 | 90 | 120 |
| Total 1,3-butadiene, wt. percent | 96.27 | 99.66 | 99.86 | 99.94 | 99.95 | 99.95 |
| Vinylacetylene, p.p.m | 1,390 | 355 | 128 | 47 | 22 | 20 |

The 1,3-butadiene product produced during complexing in the presence of n-pentane is superior to the purity of the material produced by other methods of complexation. A comparison of products collected by (1) the above method of stripping and decomplexing, but produced by vapor-phase fluid bed complexation and (2) by transfer line complexation using liquid 1,3-butadiene-containing feed injection (dispersed liquid phase complexing) but vapor phase stripping and decomplexing with product produced by (3) complexing liquid phase in the presence of n-pentane, as discussed above, is shown in Table IV.

TABLE IV

| | Method of Complexation | | |
| --- | --- | --- | --- |
| | (1) | (2) | (3) |
| | Fluid Bed | Transfer Line | Pentane Slurry |
| Product: | | | |
| 1,3-butadiene, wt. percent | 99.76 | 99.13 | 99.95 |
| Ethylacetylene, p.p.m | 3 | 21 | 4 |
| Vinylacetylene, p.p.m | 93 | 67 | 22 |

Example 4.—Multiple-stage complexation example

A multiple-stage recovery is utilized following the basic procedure of Example 3 with respect to slurry complexing, stripping, and decomplexing; multiple staging is utilized with progressively decreasing slurry complexing temperatures in order to improve recovery. The first-stage recovery of a typical two-system is demonstrated by adding to a 50 wt. percent slurry of active cuprous chloride sorbent solids in n-pentane (300 grams of pentane and 300 grams of sorption-active cuprous chloride sorbent solids having an average particle size of 50 microns and ranging in size from about 5 to 100 microns; 137 grams of raw $C_4$ feed containing 33 wt. percent 1,3-butadiene at a first-stage slurry complexing temperature of 105° F. After one hour the solids are removed from the liquid by filtering, and a portion of the complexed solids were thermally desorbed and the amount of 1,3-butadiene complex was determined to be 40.2 grams. With only 45.2 grams of 1,3-butadiene being fed, this is equal to 88.9% recovery, but based on the dissociation pressure at 105° F., the expected recovery is 90.5% if the system equilibrated. The solids in effect complex to a level of 49.2% of theoretical as determined by the method previously mentioned in Example 3, but from the close approach to equilibrium it is apparent that a considerable excess of solids had been used. However, the excess capacity can be utilized for further recovery as shown below.

A portion of the remaining 1,3-butadiene in the liquid can be recovered by cooling the reactants and slurry to lower temperatures. For example, in a reactor at 60° F., a slurry of 303.7 grams of sorption-active cuprous chloride sorbent having a particle size described hereinabove that is 50% complexed (equal to 264 grams of decomplexed solid) is added to 300 grams of n-pentane. To the reactor is added 125 grams of raw feed diluted with essentially 1,3-butadiene-free butenes to give a feed containing 12.9 grams of 1,3-butadiene. The percent complexed of the solids increases from 50% to 67.9% in 10 minutes at the lower slurry complexing temperature of 60° F. This results in an increase in 1,3-butadiene complex of 9.2 grams. Recovery in the second stage reactor is equal to 71.3% of the 1,3-butadiene feed and the combined recovery of both stages is equivalent to approximately 92% of the feed 1,3-butadiene fed to the first stage. The total recovery can be increased further by further reduction in slurry phase complexing temperature in third or subsequent stages to approximately 10 to 20° F., so that 98 to 99% of the total 1,3-butadiene feed is recoverable readily.

Example 5.—Continuous multiple-stage slurry complexing

Multiple-stage recovery of 1,3-butadiene is demonstrated in a continuous flow stirred tank reactor rather than a series of batch reactors. This reactor consists of a continuous screw feeder for dry complexed or partially complexed cuprous chloride solids, an appropriate liquid feed and diluent blending tank with flow controls, a stirred tank reactor of 1,000 cubic centimeters volume into which each of the feeds, solid and liquid is connected, and a slurry receiver vessel. The stirred tank reactor is equipped with cooling and an overflow for slurry to the slurry receiver, and the slurry receiver is provided with a filter medium to remove the solids from the liquid. The stirred tank reactor also has thermocouple connectors to allow temperature measurement and a liquid sample point to sample the slurry liquid connected to a very sensitive continuous automatic sampling gas chromatograph. Pressurized operation is either obtained by a superficial nitrogen over-pressure or by allowing the $C_4$ stream to partially vaporize.

To the liquid feed tank, pentane and 1,3-butadiene containing feed are added and blended by a pumparound system to give a feed of the desired composition. The said reactor is then filled to the overflow point with this material, with the agitator in operation at 900 to 1200 r.p.m. using a 3-inch marine propeller. The dry solids feed is then started at the desired rate and reactor slurry temperature adjusted by use of coolant on the reactor walls. The weight ratio of solids to n-pentane in the slurry vessel is carried over a considerable range; however, operation is from 0.5:1 to 2:1, more preferably 1:1. The weight percent 1,3-butadiene on n-pentane is normally 3% to 17%, depending upon the stage of recovery being conducted. The solids recovered in the slurry receiver are either dried or decomplexed for further studies or recycled to the system via the solids feeder for use in the stage recovery system. A typical three-stage operation consists of recycling the solids to the reactor twice, and the results are shown on the following table:

TABLE V

| | First Stage | Second Stage | Third Stage |
| --- | --- | --- | --- |
| Temperature, ° F | 105 | 55 | 10 |
| Holding time, minutes | 20 | 10 | 10 |
| Feed composition, percent butadiene | 15.2 | 6.6 | 0.96 |
| Percent 1,3-butadiene recovery, overall | 60.3 | 93.0 | 99.0 |
| Slurry solids, wt. percent on n-$C_5$ diluent plus solids | 52 | 49 | 54 |

As shown by the above data, butadiene recovery is enhanced by staging the slurry phase complexing in a plurality of stages with each successive stage being conducted at lower slurry complexing temperatures.

Example 6.—Butadiene recovered from a $C_4$ stream by contact with a n-heptane slurry of active cuprous chloride—continuous process with recycle The same $C_4$ feed used in Example 3 was used to demonstrate butadiene recovery via a n-heptane slurry process. However, the jacketed glass autoclave was replaced by a 1-liter stirred Parr bomb. Two hundred grams of sorption-active cuprous chloride solids of the same type and size as used in Example 3 were placed in the bomb along with 300 g. of n-heptane and 150 g. of the butadiene-containing $C_4$ feed. The contents were stirred for 1 hour at 60° F. and 20 p.s.i.g., and then heated to 130° F. for 1 hour at atmospheric pressure using a continuous feed of pure butadiene to strip unreacted feed from the slurry. Finally, the reactor was heated to 170–200° F. at atmospheric pressure with a slight nitrogen purge to decomplex the butadiene from the cuprous chloride in the slurry. The amount of high purity butadiene product collected indicated that the cuprous chloride was 61% complexed.

Example 7.—Butadiene recovery from a $C_4$ stream by contact with a n-dodecane slurry of active cuprous chloride The same butadiene-containing $C_4$ feed of Example 3 is used to demonstrate butadiene recovery using a n-dodecane slurry of active cuprous chloride. The same apparatus of Example 6 is also used. Two hundred grams of sorption-active cuprous chloride, 200 g. of n-dodecane, and 150 g. of $C_4$ feed are stirred for 1 hour at 80° F. and 35 p.s.i.g. The autoclave (Parr bomb) is then heated at 130° F. and the contents are stripped with pure butadiene at atmospheric pressure for 1 hour to remove unreacted feed. The decomplexing is carried out at 180–200° F. and atmospheric pressure using a nitrogen purge for 20 minutes. The high purity butadiene product recovered indicated that the cuprous chloride in the slurry had been 55% complexed.

Example 8.—Ethylene recovery from an ethylene-containing stream by contact with a pentane slurry of active cuprous chloride A slurry of 50 wt. percent sorption-active cuprous chloride in n-pentane (560 g. each) was charged to a stirred autoclave held at 5° F. A gaseous feed stream of 50% ethylene in nitrogen was bubbled through the slurry against an outlet pressure regulator holding the reactor contents at 206 p.s.i.g. The concentration of ethylene in the exit gas remained at about 6% which is within 1% of what would be predicted from the dissociation pressure of the ethylene-cuprous chloride complex. This composition of exit gas was maintained for 45 minutes and then the ethylene concentration rose sharply to the feed value. The slurry was then depressured to 85 p.s.i.g. and stripped with pure ethylene to remove $N_2$. Decomplexing was carried out at 75–77° F. and 85 p.s.i.g. to recover high purity (>99%) ethylene. The solids loading obtained was 52% of the theoretical 1:1 complex obtained with ethylene.

Example 9.—Propylene recovery from a $C_3$ stream by contact with an n-pentane slurry of active cuprous chloride A sulrry of 50 wt. percent of sorption-active cuprous chloride in n-pentane is charged to a stirred autoclave held at −20° F. Crude propylene containing 95.8% propylene, 3.8% propane, and 0.4% of allene plus methylacetylene was bubbled through the slurry against a back pressure regulator holding the reactor contents at 15 p.s.i.g. The concentration of propylene in the exit gas was about 9% giving a recovery of about 95% of the propylene in the feed. After breakthrough of the feed composition, the reactor was heated to 3° F. and purged with pure propylene at atmospheric pressure to remove unreacted feed from the slurry. Decomplexing was carried out at 1 atmosphere and 32° F. to recover high purity (>99%) propylene. The solids loading was 45% of the theoretical 1:1 complex formed between CuCl and propylene.

Example 10.—Ethylene and propylene recoveries from a $C_2$ and $C_3$ stream by contact with a pentane slurry of active cuprous chloride A slurry of 50 wt. percent of sorption-active cuprous chloride in n-pentane was charged to a stirred autoclave held at −30° F. A synthetic feed containing 40% ethylene, 10% propylene, and 50% nitrogen was bubbled through the slurry at a pressure of 200 p.s.i.g. The outlet gas contained only 2.7% ethylene. After breakthrough of the feed, the slurry was stripped with pure ethylene at −30° F. and 100 p.s.i.g., to remove dissolved feed. Decomplexing at 75–77° F. and 85 p.s.i.g. yielded a product gas of 91.3% ethylene and 8.7% propylene. The solids were loaded 52% with ethylene and 5% with propylene for a total loading of 57% of theoretical.

Example 11.—Ethylene and propylene recovery from a steam cracked $C_2$–$C_3$ cut feed using an isooctane slurry of active cuprous chloride A slurry of 50 wt. percent sorption-active cuprous chloride in isooctane was held in a stirred autoclave at 0° F. A crude $C_2$ plus $C_3$ fraction from steam cracking of gas oil was bubbled into the slurry at 60 p.s.i.g. until the feed composition broke through. The feed composition was:

| | Mole percent |
|---|---|
| Ethlyene | 48.9 |
| Ethane | 11.0 |
| Acetylene | 0.7 |
| Propylene | 37.7 |
| Propane | 1.5 |
| Allene plus methylacetylene | 0.2 |

The exit gas contained 12% ethylene and 14% propylene before feed breakthrough. After feed breakthrough, the slurry was stripped briefly with pure ethylene at 0° F. and 1 atmosphere pressure to remove unreacted feed from the slurry. Decomplexing at 75° F. and atmospheric pressure yielded a product gas containing 57.1% ethylene and 42.9% propylene. The solids were loaded to a level of 65% of theoretical.

Example 12.—Acrylonitrile recovery from an acrylonitrile containing feed stream by contact with an ethylbenzene slurry of active cuprous chloride solids A 50 wt. percent slurry of sorption-active cuprous chloride in ethylbenzene was held in a stirred autoclave at 80° F. A stream of nitrogen containing 7% acrylonitrile and 0.7% acetonitrile was made up to simulate the product from an acrylonitrile plant using oxidation of propylene in the presence of ammonia as the manufacturing process. This synthetic feed was bubbled through the slurry at 80° F. and 1 atmosphere pressure and the acrylonitrile was selectively complexed with cuprous chloride to give an 85% recovery from the feed stream. After breakthrough of the feed composition, the slurry was stripped at 80° F. and atmospheric pressure for 1 hour with a stream of nitrogen containing 7% of pure acrylonitrile to remove dissolved unreacted feed from the slurry liquid. Decomplexing was carried out at 212° F. using $N_2$ as a stripping gas and the product acrylonitrile was condensed out in a Dry Ice trap. Analysis by gas chromatography showed no acetonitrile in the product acrylonitrile.

Example 13.—Butadiene recovery from a $C_4$ stream by contact with a blend of two $C_{5+}$ paraffins A 50 wt. percent slurry of sorption-active cuprous chloride in three different paraffins is prepared as follows:

Slurry A—Paraffin diluent is pure $nC_7$
Slurry B—Paraffin diluent is 9.4 wt. percent $nC_5$, 90.6 wt. percent $nC_{12}$
Slurry C—Paraffin diluent is 7.4 wt. percent $nC_5$, 92.6 wt. percent $C_{16}$.

The three slurries are contacted separately with a stream containing 50% butadiene and 50% mixed butenes at 105° F. and 20 p.s.i.a., resulting in a reduction of the butadiene content of the effluent stream to about 15 mol percent, or a butadiene recovery of about 80% from the feed stream.

After breakthrough of the feed composition the slurries are stripped and decomplexed in two ways:

(I) No separate stripping step, but boiling of the slurry at atmospheric pressure and refluxing to take only $C_4$-constituents overhead.

(II) Stripping at atmospheric pressure and 120° F. with pure butadiene vapor, followed by decomplexing by boiling at atmospheric pressure. Both the stripping and decomplexing are carried out under reflux so that only $C_4$-constituents are taken overhead.

The following results are obtained:

|  | Slurry | | |
| --- | --- | --- | --- |
|  | A | B | C |
| I. Single step stripping, decomplexing: |  |  |  |
| Pot temperature, °F | 210 | 210 | 210 |
| Solid complex loading percent of theoretical | 65 | 65 | 65 |
| Pruity of evolved butadiene, mol percent | 52 | 62 | 69 |
| $C_4=/C_4\equiv$ratio in decomplexed product | 0.92 | 0.60 | 0.45 |
| II. Stripping followed by complexing: |  |  |  |
| Stripping temperature, °F | 120 | 120 | 121 |
| Stripping gas | (¹) | (¹) | (¹) |
| $C_4=/C_4\equiv$ratio in cumulative gas leaving stripper | 0.4 | 0.4 | 0.4 |
| Mol Stripping gas required | 0.85 | 0.49 | 0.36 |
| Mol Butadiene complexed |  |  |  |
| Decomplexing temperature, °F. (Pot temperature) | 210 | 210 | 210 |
| Purity of evolved butadiene, mol percent | 99+ | 99+ | 99+ |

¹ Butadiene.

The same pot temperatures at decomplexing conditions show that the two blends (B and C) have the same boiling point as the pure hydrocarbon diluent (A). The higher purity butadiene product obtained in the single step runs I, and the reduced stripping gas requirements shown in the two step runs II demonstrate the advantage of using a hydrocarbon blend over a single hydrocarbon.

Example 14.—Ethylene recovery from a $C_2$ stream by contact with a pentane slurry of active cuprous chloride sorbent with intermediate regeneration using butadiene as a conditioning ligand prior to recycle for further ethylene recovery A 50 wt. percent sorption-active cuprous chloride slurry in n-pentane was prepared and placed in a stirred autoclave. Using a 50% ethylene-50% ethane feed, three successive complexation runs were made at 200 p.s.i.g. and 0° F., followed by depressuring to 100 p.s.i.a. and 0° F., and decomplexing at 75–77° F. at 100 p.s.i.a. The results indicated a definite lowering of solids capacity in successive cycles. After the third cycle a cycle was run with crude butadiene as in Example 3 and then a fourth cycle was run on the ethane-ethylene feed stream as above.

$C_2^=$ RECOVERY FROM $C_2^=/C_2^-$ FEED

|  | Cycle | | | |
| --- | --- | --- | --- | --- |
|  | 1 | 2 | 3 | ¹ 4 |
| Outlet gas, P.P.$C_2^=$ p.s.i.a | 13.1 | 11.5 | 15.5 | 12.5 |
| Mol. $C_2^=$ decomplexed | 3.44 | 2.5 | 1.98 | 3.40 |
| Percent solids loading | 61.5 | 45.0 | 35.4 | 60.8 |

¹ After cycle on crude butadiene

The results clearly show the reactivating effect that a complexing-decomplexing cycle on crude butadiene has on sorption-active cuprous chloride which has been partially deactivated by repeated cycling with a monoolefin feed. This technique permits integration of an ethylene recovery plant with a butadiene recovery plant to reactivate a portion of the ethylene recovery slurry by diverting it to the butadiene recovery operation.

Example 15.—Acetylene recovery from an acetylene-containing feed stream using pentane liquid diluent and active cuprous chloride solids A 50 wt. percent slurry of sorption-active cuprous chloride in n-pentane was prepared and placed in an autoclave and held at 0° F. A synthetic feed of 20% acetylene, 40% ethylene, and 40% ethane was passed through the slurry at 0 p.s.i.g. The acetylene content of the exit gas was 2% to give an acetylene recovery of 91% of that in the feed. After breakthrough of the feed composition, the slurry was stripped with pure acetylene at 0° F. and atmospheric pressure to remove dissolved ethane and ethylene from the slurry. The slurry was then decomplexed to recover essentially pure acetylene at 1 atmosphere at 125° F. The acetylene loading of the solid complex was about 40%.

Example 16.—Isoprene from a steam cracked $C_5$ isoprene containing feed stream using ethyl benzene liquid diluent and active cuprous chloride solids A 50 wt. percent slurry of sorption-active cuprous chloride in ethyl benzene was prepared and placed in a stirred autoclave at 32° F. A crude isoprene concentrate containing about 40% isoprene, 3.6% piperylenes, and about 56% pentenes was obtained from a commercial isoprene plant, vaporized into a nitrogen carrier gas and passed through the slurry at atmospheric pressure. The crude isoprene concentrate was about 25 vol. percent of the gas stream. From the analysis of the exhaust gas, about 90% of the isoprene was recovered from the feed. After the feed composition broke through the slurry, the autoclave was heated to 80° F. and the slurry was stripped with a stream of 25 vol. percent isoprene in nitrogen to remove unreacted feed. Finally, the slurry was decomplexed at 140° F. in a stream of flowing nitrogen. The product was 93% pure isoprene with the major impurity being 6% trans piperylene. The isoprene loading of the solid complex was about 45% of theoretical.

Example 17.—Allene from an allene-containing $C_3$ feed stream using isooctane liquid diluent and active cuprous chloride solids A 50 wt. percent slurry of sorption-active cuprous chloride in isooctane was placed in an autoclave held at −20° F. An allene containing feed of the following composition was passed through the slurry at 10 p.s.i.g. back pressure.

Component:     Vol. percent
    Allene _____ 10
    Propane _____ 70
    Propylene _____ 20

The tail gas contained about 0.5% allene to give an allene recovery of 95.5%. After feed composition breakthrough, the slurry was stripped with pure allene at 80° F. and 10 p.s.i.g. to remove unreacted feed and final decomplexing was done at 170° F. and atmospheric pressure. The product allene was 99.3% pure and the loading of the solid was 55% of theoretical.

Example 18.—Methacrylonitrile from an appropriate feed stream using a mixture of $C_{10}$ to $C_{14}$ paraffins as liquid diluent and active cuprous chloride solids A slurry of 50 wt. percent sorption-active cuprous chloride in a $C_{10}$ to $C_{14}$ branched paraffin alkylate bottoms was placed in a stirred reactor held at 100° F. A feed stream simulating product of a methacrylonitrile plant was made up with the following composition:

Component:     Mole percent
    Isobutylene _____ 90
    Methacrylonitrile _____ 9
    Acrylonitrile _____ 0.5
    Acetonitrile _____ 0.5

This gas was then passed through the slurry at atmospheric pressure to give a 70% recovery of methacrylonitrile. After feed breakthrough the slurry was allowed to settle, the alkylate bottoms diluent was decanted and replaced with a fresh charge of alkylate bottoms, the slurry was resuspended with stirring, allowed to settle and diluent decanted a second time, and finally resuspended in a fresh charge of alkylate bottoms diluent. The methacrylonitrile was finally decomplexed by heating to 100° C. with a purge stream of nitrogen, from which the methacrylonitrile was condensed by cooling. The recovered methacrylonitrile contained only traces of acrylo- or acetonitrile and amounted to a loading of about 40% of theoretical in the solids.

Example 19.—Recovery of carbon monoxide from a carbon monoxide-containing synthesis gas feed stream using a heptane liquid diluent and active cuprous chloride solids A 50 wt. percent slurry of sorption-active cuprous chloride in n-heptane was prepared and placed in a stirred autoclave held at 32° F. A 50:50 mixture of CO and hydrogen was fed through the slurry at 300 p.s.i.g. to give a tail gas composition of 0.8% CO in $H_2$. After feed breakthrough the slurry was stripped with pure CO at 300 p.s.i.g. and 185° F. to remove dissolved $H_2$ from the slurry. Decomplexing at 235° F. and 300 p.s.i.g. gave 99.9% pure CO product in an amount corresponding to 50% of the theoretical 1:1 CO:CuCl complex.

Example 20.—Recovery of $C_2$ to $C_5$ complexable ligands from a refinery mixture of steam cracked $C_5$ and lighter products and regeneration (desorption) of the rich slurry in steps to liberate pure individual hydrocarbon ligands A 50 wt. percent slurry of sorption-active cuprous chloride in n-heptane was placed in a stirred autoclave and held at −30° F. The $C_5$-fraction of the product from steam cracking naphtha to 44 wt. percent $C_3$-conversion was passed through the slurry at −30° F. and 0 p.s.i.g. Under these conditions only the following materials are present in high enough concentrations to complex with the cuprous chloride.

| Component | Dissociation pressure, atm. | Conc. in feed, mol. percent |
|---|---|---|
| Ethylene | 0.13 | 25.8 |
| Propylene | 0.15 | 16.1 |
| 1,3-butadiene | ~0.0001 | 2.9 |
| Trans-1,3-pentadiene | ~0.0001 | 0.19 |
| Cis-1,3-pentadiene | ~0.0001 | 0.08 |
| Isoprene | ~0.0005 | 0.72 |
| Cyclopentene | 0.0013 | 0.47 |
| Cyclopentadiene | 0.0005 | 0.46 |

After 5 moles of gas per mole of CuCl had been passed through the slurry, the slurry was stripped briefly with nitrogen at −30° F. and atmospheric pressure to remove unreacted feed components. The complex was then dissociated stepwise with a small flow of stripping nitrogen first at 32° F. and 1 atmosphere for 15 minutes to recover an ethylene plus propylene fraction containing about 78% ethylene, 20% propylene and about 0.5% each of isoprene, cyclopentene, and cyclopentadiene. The second dissociation step was done at 120° F. for 15 minutes, also with flowing $N_2$ at 1 atmosphere to recover a concentrate of 35% isoprene, 23% cyclopentene, and 22% cyclopentadiene containing also 20% of butadiene plus piperylenes. The final dissociation cut was taken at 80° C. and 1 atmosphere to give a butadienepiperylene concentrate containing 90% 1,3-butadiene, 6% trans-piperylene, and 3% cispiperylene with about 1% other impurities. This example shows that slurry complexing is capable of reacting with a broad range of materials and separating them into concentrates by selective decomplexing. By proper control of reflux and by partial recomplexing, pure ligand cuts can be obtained.

What is claimed is:

1. A process for recovering a complexable ligand of enhanced purity from an essentially anhydrous feed containing it in lower purity wherein said ligand is capable of forming a stable complex with a cuprous halide which comprises:
    (A) contacting said feed with an essentially anhydrous slurry of (1) solid sorption-active cuprous halide sorbent particles selected from the group consisting of cuprous chloride, cuprous bromide and cuprous iodide and having a porosity above about 10% (of the volume of a particle) 550 to 10,000 A. pores in (2) an essentially anhydrous organic liquid diluent having a boiling point above the boiling point of said complexable ligand, at temperature and pressure conditions sufficient to effect liquid phase formation of a solid said cuprous halide-ligand complex, and
    (B) desorbing said solid complex in the presence of said liquid diluent to recover said ligand.

2. A process as in claim 1 wherein said ligand is capable of forming a stable complex with said cuprous halide having a mol ratio of copper to complexing ligand of greater than 1:1.

3. A process as in claim 2 wherein said ligand forms a stable complex with said cuprous halide having a mole ratio of copper to complexing ligand of at least 2:1.

4. A process as in claim 1 wherein said cuprous halide is cuprous chloride.

5. A process as in claim 1 wherein said liquid phase slurry complexing is conducted in a plurality of sequential liquid phase slurry complexing steps, each succeeding liquid phase slurry complexing step being conducted at a lower temperature than the preceding one with all said steps being conducted in the presence of said organic liquid diluent.

6. A process as in claim 1 wherein said organic liquid diluent is essentially inert to reaction with said cuprous halide sorbent.

7. A process as in claim 6 wherein said inert organic liquid diluent is hydrocarbon.

8. A process as in claim 1 wherein said organic liquid diluent is comprised of at least one component having a boiling point lower than the temperature at which said cuprous halide sorbent deactivates and at least another component having a boiling point higher than said sorbent deactivation temperature with the proviso that the composite boiling point of said diluent is below said sorbent deactivation temperature.

9. A process as in claim 1 wherein said organic liquid diluent has a boiling point lower than the temperature at which said cuprous halide sorbent deactivates.

10. A process as in claim 7 wherein said inert liquid hydrocarbon diluent is comprised of $C_{5+}$ paraffins.

11. A process as in claim 7 wherein said inert liquid hydrocarbon diluent is comprised of aromatic hydrocarbons.

12. A process as in claim 11, wherein the inert liquid aromatic hydrocarbon diluent is a $C_6$ to $C_{12}$ monocyclic aromatic hydrocarbon containing up to 6 alkyl substituent carbon atoms.

13. A process as in claim 1 wherein the concentration of said organic liquid diluent in said slurry ranges from 40 to 900 wt. percent, based on total cuprous halide solids.

14. A process as in claim 1 wherein said slurry contains from 10 to about 70 wt. percent of said sorption-active cuprous halide solids, based on the total of slurry solids and liquids.

15. A process as in claim 13 wherein the average particle size of said cuprous halide sorbent particles is $<200\mu$.

16. A process as in claim 3 wherein said ligand is a $C_3$ to $C_{10}$ multiolefin.

17. A process as in claim 3 wherein said ligand is a $C_2$ to $C_{10}$ nitrile.

18. A process as in claim 1 wherein said ligand is a $C_2$ to $C_{20}$ monoolefin.

19. A process as in claim 16 wherein said multiolefin ligand is 1,3-butadiene.

20. A process as in claim 17 wherein said nitrile is acrylonitrile.

21. A process as in claim 18 wherein said monoolefin is ethylene.

22. A process as in claim 18 wherein said monoolefin is propylene.

23. A process as in claim 1 wherein the desorbed slurry from (B) comprised of said sorption-active cuprous halide sorbent solids and said organic liquid diluent are recycled to said liquid phase complexing (A).

24. A process as in claim 18 wherein the desorbed slurry from (B), comprised of at least partially deactivated cuprous halide sorbent particles and said organic liquid diluent, is regenerated by complexing with a conditioning ligand forming a stable complex having a mole ratio of copper to conditioning ligand of greater than 1:1 and then desorbing said conditioning ligand therefrom prior to recycling said slurry to said liquid phase complexing (A).

25. A process as in claim 24 wherein said conditioning ligand is butadiene.

26. A process as in claim 24 which includes recovering said desorbed conditioning ligand.

References Cited

UNITED STATES PATENTS

| 3,268,614 | 8/1966 | Long | 260—681.5 |
| 3,348,908 | 10/1967 | Long et al. | 23—97 |
| 3,403,196 | 9/1968 | Long et al. | 260—677 |
| 3,409,692 | 11/1968 | Long et al. | 260—677 |
| 3,410,924 | 11/1968 | Fasce | 260—677 |
| 3,411,871 | 11/1968 | Bauch et al. | 23—97 |

DELBERT E. GANTZ, Primary Examiner

G. E. SCHMITKONS, Assistant Examiner

U.S. Cl. X.R.

23—97, 204; 260—674, 675.5, 677, 679, 681.5